United States Patent
Lehtiniemi et al.

(10) Patent No.: US 9,110,869 B2
(45) Date of Patent: Aug. 18, 2015

(54) VISUAL REPRESENTATION OF A CHARACTER IDENTITY AND A LOCATION IDENTITY

(71) Applicant: Nokia Corporation, Espoo (FI)

(72) Inventors: Arto Juhani Lehtiniemi, Lempaala (FI); Jussi Artturi Leppanen, Tampere (FI); Antti Johannes Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 22 days.

(21) Appl. No.: 14/039,679

(22) Filed: Sep. 27, 2013

(65) Prior Publication Data

US 2015/0095749 A1    Apr. 2, 2015

(51) Int. Cl.
*G06K 9/00* (2006.01)
*G06F 17/21* (2006.01)

(52) U.S. Cl.
CPC ................................. *G06F 17/211* (2013.01)

(58) Field of Classification Search
USPC .................. 382/175, 176, 177, 180, 292, 305
See application file for complete search history.

(56) References Cited

U.S. PATENT DOCUMENTS

| | | | | |
|---|---|---|---|---|
| 8,725,565 B1 * | 5/2014 | Ryan | ............................ | 705/14.4 |
| 8,793,575 B1 * | 7/2014 | Lattyak et al. | ................. | 715/273 |
| 8,832,584 B1 * | 9/2014 | Agarwal et al. | ............... | 715/776 |
| 2002/0054083 A1 * | 5/2002 | Boreczky et al. | ............. | 345/738 |
| 2003/0135826 A1 | 7/2003 | Dozier | | |
| 2007/0168413 A1 | 7/2007 | Barletta et al. | | |

OTHER PUBLICATIONS

"Explore Your Book with X-Ray," Amazon.com Help: Explore Your Book with X-Ray, www.amazon.com/gp/help/customer/display.html, printed Dec. 30, 2013, 2 pages.

International Search Report and Written Opinion of the International Searching Authority received in Patent Cooperation Treaty Application No. PCT/FI2014/050675, dated Dec. 22, 2014, 8 pages.

Dozier, Christopher, et al., "Named Entity Recognition and Resolution in Legal Text," Semantic Processing of Legal Texts, Jan. 1, 2010, pp. 27-43.

* cited by examiner

*Primary Examiner* — Phuoc Tran
(74) *Attorney, Agent, or Firm* — McClure and Associates, PLLC

(57) ABSTRACT

A method comprising determining that, at least a part of, content of a section of a document is being displayed, determining at least one character identity, determining at least one location identity indicated by the section, and determining at least one visual representation of the location identity such that the visual representation of the location identity comprises a visual representation of the character identity that indicates a relationship between the character identity and the location identity is disclosed.

20 Claims, 11 Drawing Sheets

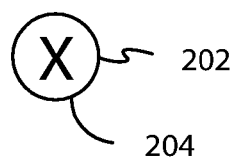
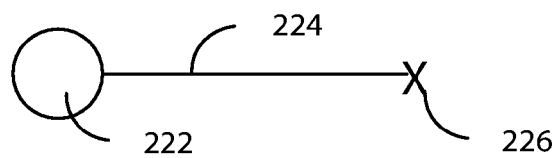
FIG. 2A  FIG. 2B
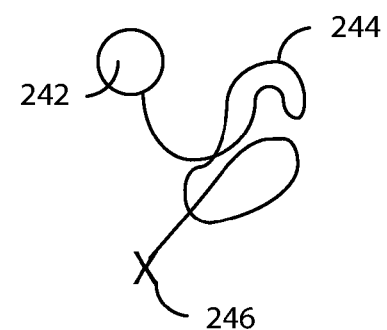
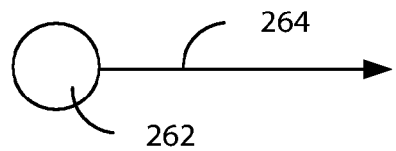
FIG. 2C  FIG. 2D
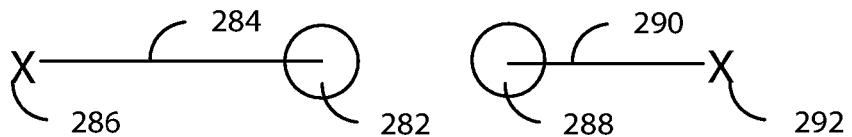
FIG. 2E

300

| 🏠 ■ 👓 🕐 | Charles Dickens | 🔍 ᴬA ✴ 🔖 |

"Many can't go there; and many would rather die."

"If they would rather die," said Scrooge, "they had better do it, and decrease the surplus population. Besides-excuse me-I don't know that."

"But you might know it," observed the gentleman.

"It's not my business," Scrooge returned "It's enough for a man to under-stand his own business, and not to interfere with other people's. Mine occu-pies me constantly. Good afternoon, gentlemen!"

Seeing clearly that it would be useless to pursue their point, the gentlemen withdrew. Scrooge resumed his labours with an improved opinion of him- — 302
self, and in a more facetious temper than was usual with him.

Meanwhile the fog and darkness thickened so, that people ran about with flaring links, proffering their services to go before horses in carriages, and conduct them on their way. The ancient tower of a church, whose gruff old bell was always peeping slily down at Scrooge out of a Gothic window in the wall, became invisible, and struck the hours and quarters in the clouds, with tremulous vibrations afterwards as if its teeth were chattering in its frozen head up there. The cold became intense. In the main street, at the corner of THE FIRST OF THE THREE SPIRITS
44 pages left in chapter

FIG. 3A

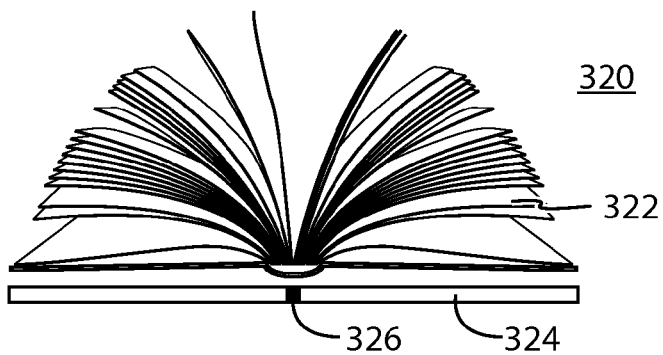

FIG. 3B

It could scarcely be called a trade, in spite of his favourite description of himself as "a honest tradesman." His stock consisted of a wooden stool, made out of a broken-backed chair cut down, which stool, young Jerry, walking at his father's side, carried every morning to beneath the banking-house window that was nearest Temple Bar: where, with the addition of the first handful of straw that could be gleaned from any passing vehicle to keep the cold and wet from the odd-job-man's feet, it formed the encampment for the day. On this post of his, Mr. Cruncher was as well known to Fleet-street and the Temple, as the Bar itself,--and was almost as in-looking. — 402

404 — Encamped at a quarter before nine, in good time to touch his three-cornered hat to the oldest of men as they passed in to Tellson's, Jerry took up his station on this windy March morning, with young Jerry standing by him, when not engaged in making forays through the Bar, to

FIG. 4A

It could scarcely be called a trade, in spite of his favourite description of himself as "a honest tradesman." His stock consisted of a wooden stool, made out of a broken-backed chair cut down, which stool, young Jerry, walking at his father's side, carried every morning to beneath the banking-house window that was nearest Temple Bar*</location ="Temple Bar, London,England">*: where, with the addition of the first handful of straw that could be gleaned from any passing vehicle to keep the cold and wet from the odd-job-man's feet, it formed the encampment for the day. On this post of his, Mr. Cruncher was as well known to Fleet-street and the Temple, as the Bar — 422

424 — itself,--and was almost as in-looking.

Encamped at a quarter before nine, in good time to touch his three-cornered hat to the oldest of men as they passed in to Tellson's, Jerry *<character ="Jerry Cruncher">* took up his station on this windy March morning, with young Jerry standing by him, when not engaged in making forays through the Bar, to

FIG. 4B

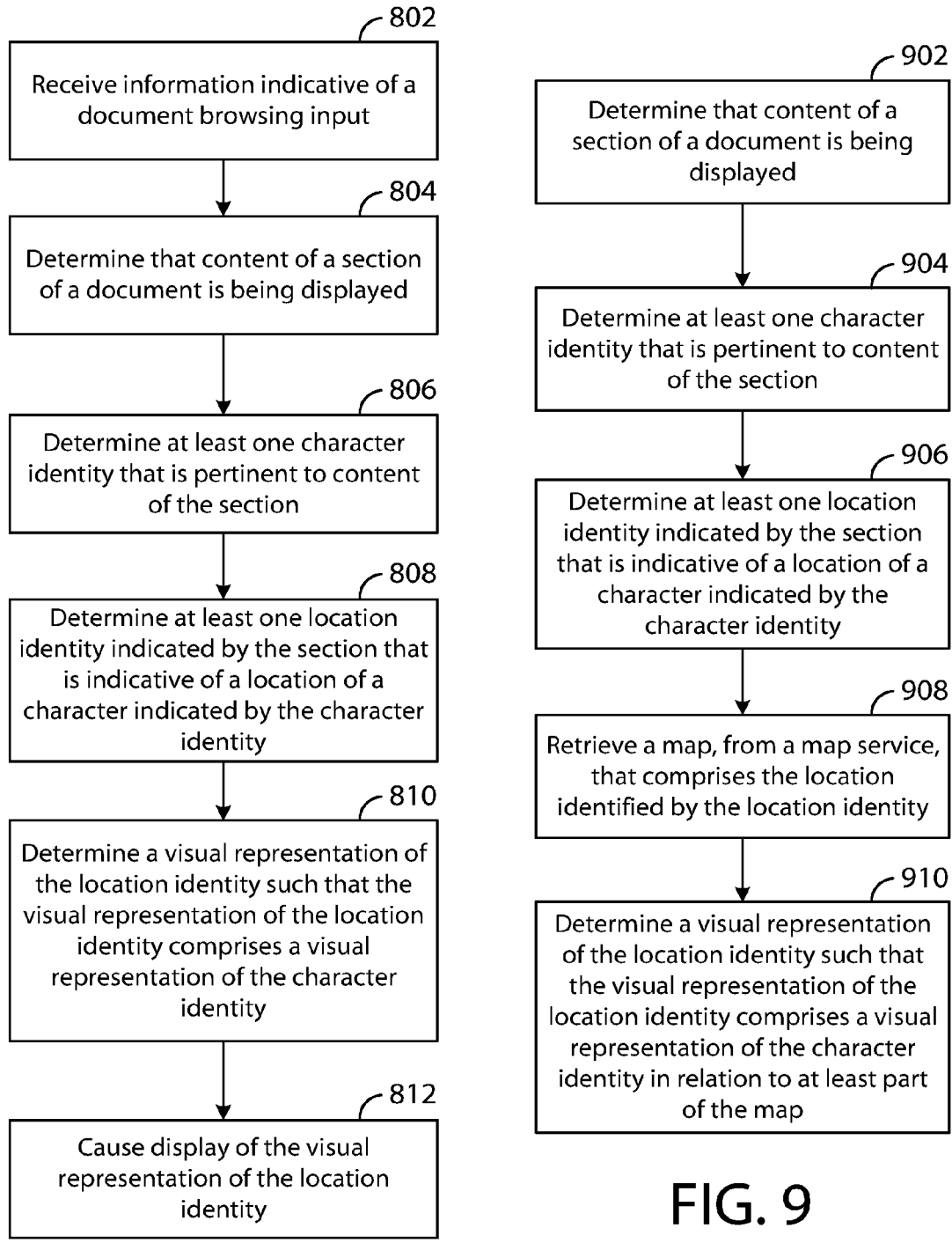

VISUAL REPRESENTATION OF A CHARACTER IDENTITY AND A LOCATION IDENTITY

TECHNICAL FIELD

The present application relates generally to representation of information of a document.

BACKGROUND

As electronic apparatuses become more prolific, the amount of activities that a user may perform with the apparatus is increasing. For example, many users interact with their apparatuses in manners that, in the past, were unassociated with an electronic apparatus. For example, many users interact with documents, such as books, by way of their electronic apparatuses. It may be desirable to allow a user to interact with a document by way of an electronic apparatus in a simple and intuitive manner.

SUMMARY

Various aspects of examples of the invention are set out in the claims.

One or more embodiments may provide an apparatus, a computer readable medium, a non-transitory computer readable medium, a computer program product, and a method for determining that, at least a part of, content of a section of a document is being displayed, determining at least one character identity, the character identity being pertinent to content of the section, determining at least one location identity indicated by the section, the location identity being indicative of a location of a character indicated by the character identity, and determining at least one visual representation of the location identity such that the visual representation of the location identity comprises a visual representation of the character identity that indicates a relationship between the character identity and the location identity.

One or more embodiments may provide an apparatus, a computer readable medium, a computer program product, and a non-transitory computer readable medium having means for determining that, at least a part of, content of a section of a document is being displayed, means for determining at least one character identity, the character identity being pertinent to content of the section, means for determining at least one location identity indicated by the section, the location identity being indicative of a location of a character indicated by the character identity, and means for determining at least one visual representation of the location identity such that the visual representation of the location identity comprises a visual representation of the character identity that indicates a relationship between the character identity and the location identity.

In at least one example embodiment, the section relates to at least one of a chapter, an act, a subchapter, or a page.

In at least one example embodiment, the section relates to a delineation of content that distinguishes the content of the section from other content of the document.

One or more example embodiments further perform causation of display of the visual representation of the location identity.

In at least one example embodiment, display of the visual representation of the location identity is caused to be proximate to the part of the section.

In at least one example embodiment, display of the visual representation of the location identity is caused to be above the part of the section.

One or more example embodiments further perform receiving information indicative of a document browsing input, wherein the causation of display of the visual representation of the location identity is based, at least in part, on the document browsing input.

In at least one example embodiment, the document browsing input is distinct from a reading navigation input.

In at least one example embodiment, the reading navigation input relates to an input associated with navigation of the document during reading.

In at least one example embodiment, the document browsing input relates to a continuous stroke input, and causation of display of the visual representation of the location identity corresponds with contact of the continuous stroke input.

In at least one example embodiment, the continuous stroke input comprises a contact input and a release input, and the causation of display of the visual representation of the location information corresponds with the contact input.

One or more example embodiments further perform causation of termination of display of the visual representation of the location identity, such that the termination of display corresponds with the release input.

In at least one example embodiment, causation of display is performed during a browsing mode.

In at least one example embodiment, causation of display is performed during a reading mode.

In at least one example embodiment, the content of the section relates to non-metadata information.

In at least one example embodiment, the document relates to an electronic book.

In at least one example embodiment, the content relates to the body of the electronic book.

In at least one example embodiment, the character identity relates to a character portrayed in the content of the document.

In at least one example embodiment, the character identity being pertinent to the content of the section relates to the character of the character identity being portrayed by at least part of the content of the section.

In at least one example embodiment, the location identity relates to a location that is relevant to the content of the document.

In at least one example embodiment, the location identity being indicative of a location of a character indicated by the character identity relates to the character being portrayed in correspondence with the location by at least part of the content of the document.

One or more example embodiments further perform determination of at least one other character identity, the other character identity being pertinent to content of the section and being different than the character identity, and determination of at least one other location identity indicated by the section, the location identity being indicative of a location of a character indicated by the character identity.

In at least one example embodiment, the visual representation of the location identity comprises a visual representation of the other location identity such that the visual representation of the other location identity comprises a visual representation of the other character identity that indicates a relationship between the other character identity and the other location identity.

In at least one example embodiment, the location identity and the other location identity relate to map locations and the visual representation of the location identity relates to a map that comprises the location identity and the other location identity.

In at least one example embodiment, indication of the relationship between the character identity and the location identity relates to the visual representation of the character identity corresponding to the location of the location identity in the visual representation of the location identity.

In at least one example embodiment, indication of the relationship between the other character identity and the other location identity relates to the visual representation of the other character identity corresponding to the location of the other location identity in the visual representation of the other location identity.

One or more example embodiments further perform retrieval of the map based, at least in part, on the location identity and the other location identity.

In at least one example embodiment, the location identity and the other location identity relate to non-fictional locations, and retrieval of the map comprises retrieval of the map from a map service.

In at least one example embodiment, the location identity and the other location identity relate to fictional locations, and retrieval of the map comprises extraction of the map from the document.

In at least one example embodiment, the document comprises metadata that comprises information indicative of the map, and extraction of the map from the document comprises copying of the metadata from the document.

One or more example embodiments further perform determination of at least one of a zoom level of the map or a crop region of the map, such that the map comprises the location identity and the other location identity.

One or more example embodiments further perform determination that, at least part of, a different section of the document is being displayed, determination of at least one other character identity, the other character identity being pertinent to content of the different section, determination of at least one other location identity indicated by the different section, the other location identity being indicative of a location of a character indicated by the other character identity, and determination of at least one visual representation of the other location identity such that the visual representation of the other location identity comprises a visual representation of the other character identity that indicates a relationship between the other character identity and the other location identity.

In at least one example embodiment, determination of the character identity comprises identification of at least one metadata element that represents the character identity, the at least one metadata element being associated with the section.

In at least one example embodiment, determination of the location identity comprises identification of at least one metadata element that represents the location identity, the at least one metadata element being associated with the section.

In at least one example embodiment, determination of the character identity comprises identification of non-metadata content of the section that identifies the character identity.

In at least one example embodiment, the non-metadata content relates to non-metadata textual information that identifies the character identity.

In at least one example embodiment, the character identity relates to a name of the character associated with the character identity.

In at least one example embodiment, determination of the location identity comprises identification of non-metadata content of the section that identifies the location identity.

In at least one example embodiment, the non-metadata content relates to non-metadata textual information that identifies the location identity.

In at least one example embodiment, the location identity relates to a name of the location associated with the location identity.

In at least one example embodiment, the location identity relates to a map location and the visual representation of the location identity relates to a map that comprises the location identity.

In at least one example embodiment, indication of the relationship between the character identity and the location identity relates to the visual representation of the character identity corresponding to the location of the location identity in the visual representation of the location identity.

One or more example embodiments further perform retrieval of the map based, at least in part on the location identity.

In at least one example embodiment, the location identity relates to a non-fictional location, and retrieval of the map comprises retrieval of the map from a map service.

In at least one example embodiment, retrieval of the map from the map service comprises sending a search query to the map service that identifies the location identity.

In at least one example embodiment, the location identity relates to a fictional location, and retrieval of the map comprises extraction of the map from the document.

In at least one example embodiment, the document comprises metadata that comprises information indicative of the map, and extraction of the map from the document comprises copying of the metadata from the document.

In at least one example embodiment, the visual representation of the character identity relates to an image of the character of the character identity.

One or more example embodiments further perform determination of the visual representation of the character identity.

In at least one example embodiment, determination of the visual representation of the character identity comprises search for the image of the character by way of an internet search engine, and receipt of the image based, at least in part, on the search.

In at least one example embodiment, the visual representation of the character identity relates to at least one of an icon or a textual representation of the character identity.

In at least one example embodiment, the visual representation of the location identity relates to an image of a scene that relates to the location identity.

One or more example embodiments further perform retrieval of the image based, at least in part on the location identity.

In at least one example embodiment, the location identity relates to a non-fictional location, and retrieval of the image comprises search for the image of the scene by way of an internet search engine, and receipt of the image based, at least in part, on the search.

In at least one example embodiment, indication of a relationship between the character identity and the location identity relates to the visual representation of the character identity being within the scene.

One or more example embodiments further perform determination of at least one commercial label, the commercial label being pertinent to content of the section, and determination of a visual advertisement associated with the commercial label.

One or more example embodiments further perform causation of display of the visual advertisement in relation to the visual representation of the location identity.

In at least one example embodiment, the commercial label relates to at least one of a product name, a company name, a trademark, or a slogan.

In at least one example embodiment, determination of the commercial label comprises identification of metadata that corresponds with the commercial label.

In at least one example embodiment, determination of the commercial label comprises identification of non-metadata content of the section that identifies the commercial label.

In at least one example embodiment, the non-metadata content relates to non-metadata textual information that identifies the commercial label.

BRIEF DESCRIPTION OF THE DRAWINGS

For a more complete understanding of embodiments of the invention, reference is now made to the following descriptions taken in connection with the accompanying drawings in which:

FIGS. 2A-2E are diagrams illustrating touch inputs according to at least one example embodiment;

FIGS. 3A-3B are diagrams illustrating document interaction according to at least one example embodiment;

FIGS. 4A-4B are diagrams illustrating document content according to at least one example embodiment;

FIG. 8 is a flow diagram illustrating activities associated with determination of a visual representation of a location identity and a character identity according to at least one example embodiment;

FIG. 9 is a flow diagram illustrating activities associated with determination of a visual representation of a location identity and a character identity according to at least one example embodiment;

DETAILED DESCRIPTION OF THE DRAWINGS

Figure 1:
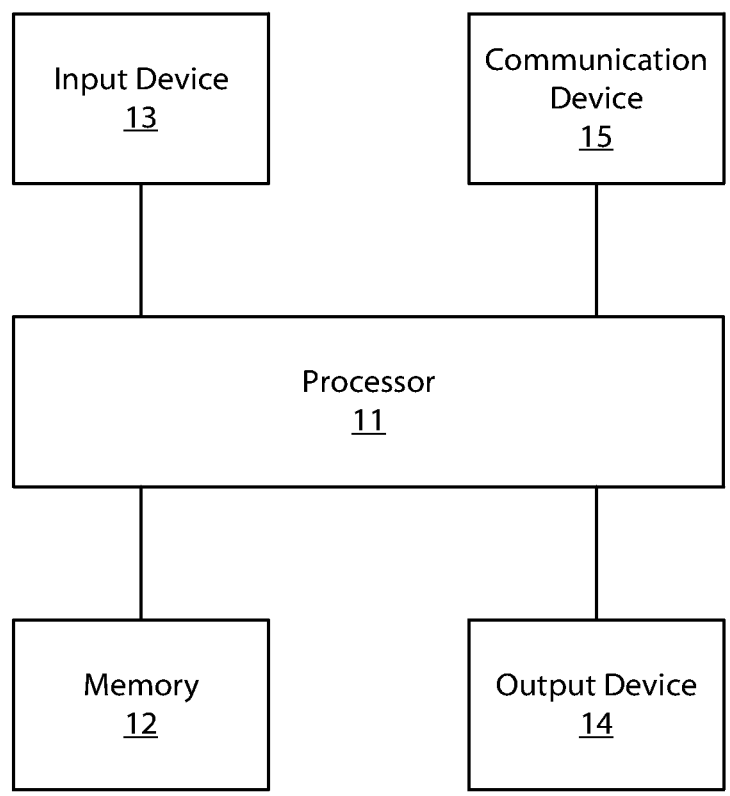
FIG. 1 is a block diagram showing an apparatus according to an example embodiment.

An embodiment of the invention and its potential advantages are understood by referring to FIGS. 1 through 14 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, a refrigerator, and automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may relate to, at least part of, a non-carryable apparatus, such as a large screen television, a refrigerator, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may relate to information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

FIGS. 2A-2E are diagrams illustrating touch inputs according to at least one example embodiment. The examples of FIGS. 2A-2E are merely examples of touch inputs, and do not limit the scope of the claims. For example, number of inputs may vary, relationship between inputs may vary, orientation of inputs may vary, and/or the like.

In FIGS. 2A-2E, a circle represents an input related to contact with a touch sensor, such as a touch display, two crossed lines represent an input related to releasing a contact from a touch sensor, and a line represents input related to movement on a touch sensor. Although the examples of FIGS. 2A-2E indicate continuous contact with a touch sensor, there may be a part of the input that fails to make direct contact with the touch sensor. Under such circumstances, the apparatus may, nonetheless, determine that the input is a continuous stroke input. For example, the apparatus may utilize proximity information, for example information relating to nearness of an input implement to the touch sensor, to determine part of a touch input.

It should be understood that, even though touch sensor information is described in terms of contact and release, many touch sensors may determine that a contact occurs when the user's hand is within a threshold distance from the apparatus, without physically contacting the apparatus. Therefore, contact may relate to circumstances where the touch sensor determines that proximity is sufficiently close enough to determine existence of contact. Similarly, release may relate to circumstances where the touch sensor determines that proximity is sufficiently distant enough to determine termination of contact.

In the example of FIG. 2A, input 200 relates to receiving contact input 202 and receiving a release input 204. In this example, contact input 202 and release input 204 occur at substantially the same position. In an example embodiment, an apparatus utilizes the time between receiving contact input 202 and release input 204. For example, the apparatus may interpret input 200 as a tap for a short time between contact input 202 and release input 204, as a press for a longer time between contact input 202 and release input 204, and/or the like.

In the example of FIG. 2B, input 220 relates to receiving contact input 222, a movement input 224, and a release input 226. Input 220 relates to a continuous stroke input. In this example, contact input 222 and release input 226 occur at different positions. Input 220 may relate to dragging an object from one position to another, to moving a scroll bar, to panning a virtual screen, to drawing a shape, and/or the like. In an example embodiment, an apparatus interprets input 220 based at least in part on the speed of movement 224. For example, if input 220 relates to panning a virtual screen, the panning motion may be small for a slow movement, large for a fast movement, and/or the like. In another example embodiment, an apparatus interprets input 220 based at least in part on the distance between contact input 222 and release input 226. For example, if input 220 relates to a scaling operation, such as resizing a box, the scaling may relate to the distance between contact input 222 and release input 226. An apparatus may interpret the input before receiving release input 226. For example, the apparatus may evaluate a change in the input, such as speed, position, and/or the like. In such an example, the apparatus may perform one or more determinations based upon the change in the touch input. In such an example, the apparatus may modify a text selection point based at least in part on the change in the touch input.

In the example of FIG. 2C, input 240 relates to receiving contact input 242, a movement input 244, and a release input 246 as shown. Input 240 relates to a continuous stroke input. In this example, contact input 242 and release input 246 occur at different positions. Input 240 may relate to dragging an object from one position to another, to moving a scroll bar, to panning a virtual screen, to drawing a shape, and/or the like. In an example embodiment, an apparatus interprets input 240 based at least in part on the speed of movement 244. For example, if input 240 relates to panning a virtual screen, the panning motion may be small for a slow movement, large for a fast movement, and/or the like. In another example embodiment, an apparatus interprets input 240 based at least in part on the distance between contact input 242 and release input 246. For example, if input 240 relates to a scaling operation, such as resizing a box, the scaling may relate to the distance between contact input 242 and release input 246. In still another example embodiment, the apparatus interprets the position of the release input. In such an example, the apparatus may modify a text selection point based at least in part on the change in the touch input.

In the example of FIG. 2D, input 260 relates to receiving contact input 262, and a movement input 264, where contact is released during movement. Input 260 relates to a continuous stroke input. Input 260 may relate to dragging an object from one position to another, to moving a scroll bar, to panning a virtual screen, to drawing a shape, and/or the like. In an example embodiment, an apparatus interprets input 260 based at least in part on the speed of movement 264. For example, if input 260 relates to panning a virtual screen, the panning motion may be small for a slow movement, large for a fast movement, and/or the like. In another example embodiment, an apparatus interprets input 260 based at least in part on the distance associated with the movement input 264. For example, if input 260 relates to a scaling operation, such as resizing a box, the scaling may relate to the distance of the movement input 264 from the contact input 262 to the release of contact during movement. In at least one example embodiment, the input of the example of FIG. 2D may be referred to as a swipe input, a flick input, and/or the like.

In an example embodiment, an apparatus may receive multiple touch inputs at coinciding times. For example, there may be a tap input at a position and a different tap input at a different location during the same time. In another example, there may be a tap input at a position and a drag input at a different position. An apparatus may interpret the multiple touch inputs separately, together, and/or a combination thereof. For example, an apparatus may interpret the multiple touch inputs in relation to each other, such as the distance between them, the speed of movement with respect to each other, and/or the like.

In the example of FIG. 2E, input 280 relates to receiving contact inputs 282 and 288, movement inputs 284 and 290, and release inputs 286 and 292. Input 280 relates to two continuous stroke inputs. In this example, contact input 282 and 288, and release input 286 and 292 occur at different positions. Input 280 may be characterized as a multiple touch input. Input 280 may relate to dragging an object from one position to another, to moving a scroll bar, to panning a virtual screen, to drawing a shape, to indicating one or more user selected text positions and/or the like. In an example embodiment, an apparatus interprets input 280 based at least in part on the speed of movements 284 and 290. For example, if input 280 relates to zooming a virtual screen, the zooming motion may be small for a slow movement, large for a fast movement, and/or the like. In another example embodiment, an apparatus interprets input 280 based at least in part on the distance between contact inputs 282 and 288 and release inputs 286 and 292. For example, if input 280 relates to a scaling operation, such as resizing a box, the scaling may relate to the collective distance between contact inputs 282 and 288 and release inputs 286 and 292.

In an example embodiment, the timing associated with the apparatus receiving contact inputs 282 and 288, movement inputs 284 and 290, and release inputs 286 and 292 varies. For example, the apparatus may receive contact input 282 before contact input 288, after contact input 288, concurrent to contact input 288, and/or the like. The apparatus may or may not utilize the related timing associated with the receiving of the inputs. For example, the apparatus may utilize an input received first by associating the input with a preferential status, such as a primary selection point, a starting position, and/or the like. In another example, the apparatus may utilize non-concurrent inputs as if the apparatus received the inputs concurrently. In such an example, the apparatus may utilize a release input received first the same way that the apparatus would utilize the same input if the apparatus had received the input second.

Even though an aspect related to two touch inputs may differ, such as the direction of movement, the speed of movement, the position of contact input, the position of release input, and/or the like, the touch inputs may be similar. For example, a first touch input comprising a contact input, a movement input, and a release input, may be similar to a second touch input comprising a contact input, a movement input, and a release input, even though they may differ in the position of the contact input, and the position of the release input.

FIGS. 3A-3B are diagrams illustrating document interaction according to at least one example embodiment. The examples of FIGS. 3A-3B are merely examples and do not limit the scope of the claims. For example, representation of content may vary, interaction elements may vary, orientation may vary, and/or the like.

As electronic apparatuses have become more prolific, many users are relying on electronic apparatuses for reading and perusing documents. For example, many users utilize electronic apparatuses for reading and/or browsing electronic books. There are various modes in which a user may evaluate the content of a document by way of the electronic apparatus. For example, the user may read the document, may browse through the document to obtain a general assessment of the subject matter of the document, and/or the like.

In at least one example embodiment, a document comprises content. The content may relate to a portion of the document that is intended to be read by a user. For example, if the document relates to an electronic book, the content of the electronic book may relate to the body of the electronic book. In another example, the document may relate to, at least a portion of, a video, such as a movie. In at least one example embodiment, content of the document relates to non-metadata information. For example, the document may comprise metadata information that may be utilized by one or more programs to in relation to the document. In at least one example embodiment, the apparatus may preclude presentation of metadata information to the user. For example, the apparatus may avoid causation of display of the metadata information when the document is being viewed by way of a reading mode, a browsing mode, and/or the like. It should be understood that some embodiments may limit the type of document to which the operations described herein are applied. For example, some embodiments may include textual documents, such as electronic books, and may exclude video documents, such as movies. In another example, some embodiments may include video documents and exclude textual documents.

A document may comprise one or more sections. In at least one example embodiment, a section relates to a delineation of content that distinguishes the content of the section from other content of the document. For example, the section may relate to a chapter, an act, a subchapter, a page, and/or the like. In circumstances where the document is a video, the sections may correspond to different scenes and/or chapters in the video. In at least one example embodiment, the apparatus causes display of content of at least part of a section of a document. For example, the apparatus may cause display of a page of the section of the document, a plurality of pages of the section of the document, a sub-part of a page of the document, and/or the like. In at least one example embodiment, the apparatus may determine that, at least a part of, content of a section of a document is being displayed. Such determination may be based, at least in part, on the apparatus having caused the display of the content of the section, the apparatus receiving information indicative of display of the content of the section, and/or the like.

In at least one example embodiment, a reading mode relates to an interaction mode of an apparatus that is configured to conform to a user reading the document. The reading mode may be characterized by causation of display of content of the document in a manner that allows for sequential progression through the document in a manner that is consistent with reading the document in a sequential manner. In some circumstances, a reading mode may allow for a transition to a different part of the document in a non-sequential manner. For example, the apparatus may allow for a transition to an adjacent section of the document, even if the current part of the document being displayed is non-adjacent to the section. In such an example, the apparatus may still provide for progression through the document from the transitioned to part of the document. In a reading mode, a user may progress to an adjacent part, forwards or backwards, of content of the section by way of various inputs. For example, the user may perform a drag input, a swipe input, and/or the like, indicative of forward progression in the document, such as a downward or left drag input. Similarly, the user may perform a tap input associated with a region indicative of forward progression in the document, such as a bottom region or a rightward region of the content being displayed. However, it should be understood that reading directions may vary based on language, reading styles, and/or the like. In a manner analogous to browsing an electronic book, a user might be browsing a video or movie. In one embodiment, the user is able to browse within a video stream using a display depicting a sequence of video keyframes or I-frames.

FIG. 3A is a diagram illustrating document reading mode interaction 300 according to at least one example embodiment. In the example of FIG. 3A, the document reading mode relates to display of content 302, which corresponds with a part of a section of the document being read. It can be seen that the reading mode displays information associated with the document, such as the author, "Charles Dickens." It can also be seen that a title for the section is displayed as "The first of three spirits." In this manner, it can be seen that the part of the content being displayed relates to a part of the content of the section titled "The first of three spirits" of the document "A Christmas Carol."

In at least one example embodiment, a browsing mode relates to an interaction mode of an apparatus that is configured to allow a user to observe aspects of the document without necessarily reading the document sequentially. For example, the apparatus may provide for display of information indicative of categorization of content of the document, content of a section of the document, and/or the like. For example, the browsing mode may provide section information, page count information, document position information, and/or the like. In many circumstances, a user may desire to interact with a document by way of a browsing mode when the user desires to review a part of the document that the user has already read, when the user desires to preview a part of the document, when the user desires to briefly gain an overview of a part of the document, and/or the like. In some circumstances, it may be desirable to provide an easily recognizable difference between the reading mode and the browsing mode, so that a user does not feel the need to sequentially read the content of the document in browsing mode. For example, it may be desirable to avoid a sequential display of content of the document in the browsing mode.

FIG. 3B is a diagram illustrating document browsing mode interaction 320 according to at least one example embodiment. In the example of FIG. 3B, browsing mode 320 comprises book representation 322 and position slider 324. In at least one example embodiment, the book representation may provide a visual indication of a position in the document that is associated with a position that the user is currently browsing. Similarly, position slider 324 may indicate the position in the document by way of position indicator 326. In at least one example embodiment, the progression through the document may be non-sequential. For example, the progression through the document may comprise a transition from a part of the document to a different part of the document in a manner that omits an intervening part of the document between the part and the other part. In a browsing mode, a user may progress to a different part, forwards or backwards, of content of the section by way of various inputs. For example, the user may perform a drag input, a swipe input, an apparatus deformation input, a motion input, and audio input, and/or the like, indicative of forward progression in the document, such as a downward or leftward drag input. Similarly, the user may perform a tap input associated with a region indicative of forward progression in the document, such as a bottom region or a rightward region of the content being displayed. However, it should be understood that reading directions may vary based on language, reading styles, and/or the like. Even though the example of FIG. 3B fails to indicate information such as section identity, author, and/or the like, various embodiments may provide more or less information than shown in the example of FIG. 3B.

Even though the examples of FIGS. 3A-3B relate to a textual document, it should be understood that there may be a document rendering mode that relates to rendering of a video. For example, there may be a document rendering mode that relates to a video player interface. The video player interface may provide for playback of at least part of the video.

FIGS. 4A-4B are diagrams illustrating document content according to at least one example embodiment. The examples of FIGS. 4A-4B are merely examples and do not limit the scope of the claims. For example, arrangement of content may vary, substance of content may vary, information comprised by the content may vary, and/or the like.

In many circumstances, it may be desirable to identify various parts of a document. For example, the document may be a story that relates to one or more characters, one or more locations, and/or the like. In such circumstances, it may be desirable to determine identity of such characters and/or locations. For example, it may be desirable for the apparatus to enhance the perceived context of the viewer by providing information indicative of the location, the character, and/or the like.

In at least one example embodiment, the apparatus determines at least one character identity. The character identity may relate to information that identifies one or more characters portrayed in the content of the document. For example, the character identity may relate to a name of the character associated with the character identity. For example, the character may be a literary character of the document. In at least one example embodiment, the character identity is pertinent to content of a currently displayed section. For example, the character identity being pertinent to the content of the section may relate to the character of the character identity being portrayed by at least part of the content of the section. In such an example, the character may be discussed within the displayed section, may be relevant to information described by the content of the section, and/or the like. In circumstances where the document relates to a video, the character may relate to a character which is currently involved in the scene.

At each frame of the video, the character may or may not be visible in the visual frame, depending on the video viewing angle.

In at least one example embodiment, the apparatus determines at least one location identity. The location identity may relate to information that identifies one or more locations indicated by the content of the document. For example, the location identity may relate to a name of the location associated with the location identity. The location identity may relate to a city, a region, a country, a landmark, a geographical element, and/or the like. The location may be a fictional or non-fictional location referred to by the document. In at least one example embodiment, the location identity is relevant to content of a currently displayed section. For example, the location identity being pertinent to the content of the section may relate to the location identity being indicative of a location of a character indicated by the character identity. In such an example, the location identity being indicative of a location of a character indicated by the character identity may relate to the character being portrayed in correspondence with the location by at least part of the content of the document, part of a currently displayed section of the document, and/or the like. In such an example, the character identity may be discussed in relation to the location identity within the displayed section, may be relevant to information described by the content of the section, and/or the like.

In some circumstances, it may be desirable for an apparatus to determine a character identity by way of identifying non-metadata content of the document that identifies a character identity. In at least one example embodiment, the non-metadata content relates to non-metadata textual information that identifies the character identity. In some circumstances, the apparatus may identify words that are likely to correspond with a character identity, may utilize a list of character identities to be recognized within the non-metadata content of the document, and/or the like. For example, the document may comprise metadata that includes a list of character identities that may be present within one or more section of the document. In such an example, the apparatus may utilize the metadata to identify elements of the non-metadata content that may correspond with character identity, such as partial names, nicknames, alternative identities, and/or the like. In this manner, the apparatus may automatically determine character identities that are pertinent to a section of the document, that are pertinent to a part of a section of the document, and/or the like. In an analogous manner, a video or movie may be accompanied by metadata which describes the characters present in each scene.

In some circumstances, it may be desirable for an apparatus to determine a location identity by way of identifying non-metadata content of the document that identifies a location identity. In at least one example embodiment, the non-metadata content relates to non-metadata textual information that identifies the location identity. In some circumstances, the apparatus may identify words that are likely to correspond with a location identity, may utilize a list of location identities to be recognized within the non-metadata content of the document, and/or the like. For example, the document may comprise metadata that includes a list of location identities that may be present within one or more section of the document. In this manner, the apparatus may automatically determine location identities that are pertinent to a section of the document, that are pertinent to a part of a section of the document, and/or the like.

FIG. 4A is a diagram illustrating document content according to at least one example embodiment. It can be seen that the content of the section of the document being displayed in the example of FIG. 4A includes location identity 402, which relates to the location of "Temple Bar," and includes character identity 404, which relates to the character of "Jerry Cruncher." In at least one example embodiment, the apparatus may determine that location identity 402 is relevant to character identity 404 by way of context of the content surrounding location identity 402 and character identity 404, by way of proximity between location identity 402 and character identity 404, and/or the like.

In some circumstances, it may be desirable for the document to comprise metadata that identifies character identities, location identities, and/or the like. In some circumstances, the metadata may indicate relevance of the location identity to the character identity. In this manner, one or more sections of the document may be classified by way of location identity, by way of character identity, and/or the like. In some circumstances, the apparatus may introduce the metadata by way of the previously described non-metadata content analysis. In some circumstances, the metadata may be included in the document by the publisher of the document. In some circumstances, the metadata may be included in the document by the distributor, such as a seller/distributor of electronic books or movies. In some circumstances, there may be a separate entity such as a service which provides metadata for electronic documents.

In at least one example embodiment, determination of the character identity comprises identification of at least one metadata element that represents the character identity. For example, the metadata element may be associated with the section of the document that is being displayed, and the apparatus may determine the character identity by way of finding the metadata element that represents the character identity.

In at least one example embodiment, determination of the location identity comprises identification of at least one metadata element that represents the location identity. For example, the metadata element may be associated with the section of the document that is being displayed, and the apparatus may determine the location identity by way of finding the metadata element that represents the location identity.

FIG. 4B is a diagram illustrating document content in relation to document metadata according to at least one example embodiment. In the example of FIG. 4B, the content comprises metadata 422 that identifies a location identifier of "Temple Bar." In the example of metadata 422, the metadata includes alternative location identities that relate to "Temple Bar." For example, the alternative location identities may relate to alternative location identities that have differing levels of granularity. For example, "Temple Bar" may be within London, which may be within England. In the example of FIG. 4B, the content comprises metadata 424 that identifies a character identifier of "Jerry Cruncher." It can be seen that the character identifier comprises a first name and a last name, and that the corresponding non-metadata content fails to include the last name of the character identity. In this manner, the metadata of the content identity may comprise information beyond the information of the non-metadata content.

Even though the examples of FIGS. 4A-4B relate to a textual document, similar examples may be applied to a video document. For example, the apparatus may utilize speech recognition, face recognition, object recognition, and/or the like, to identify characters and/or locations. In this manner, the examples described in relation to textual documents may further relate to video documents.

Figure 5A:
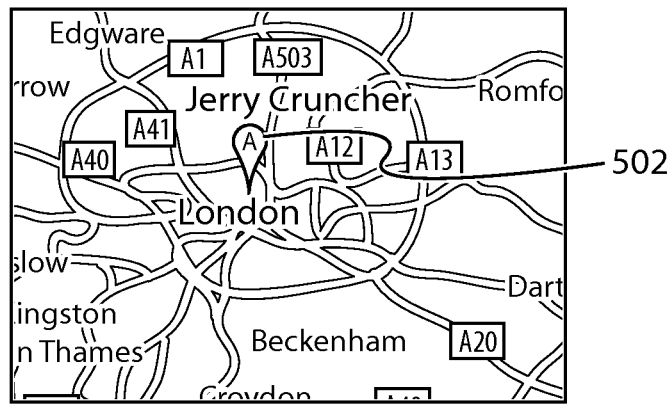
FIGS. 5A-5C are diagrams illustrating visual representations of location identity according to at least one example embodiment.
Figure 5B:
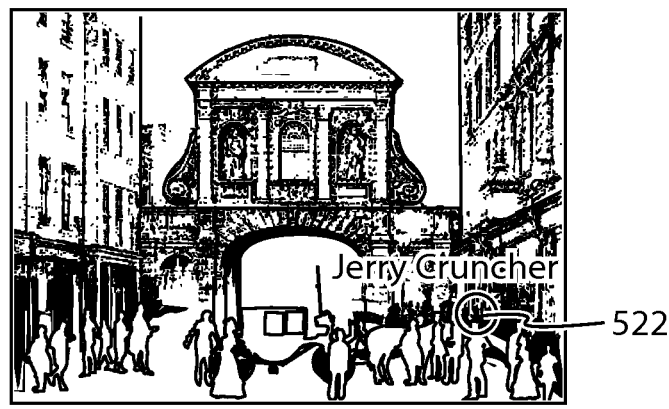
Figure 5C:
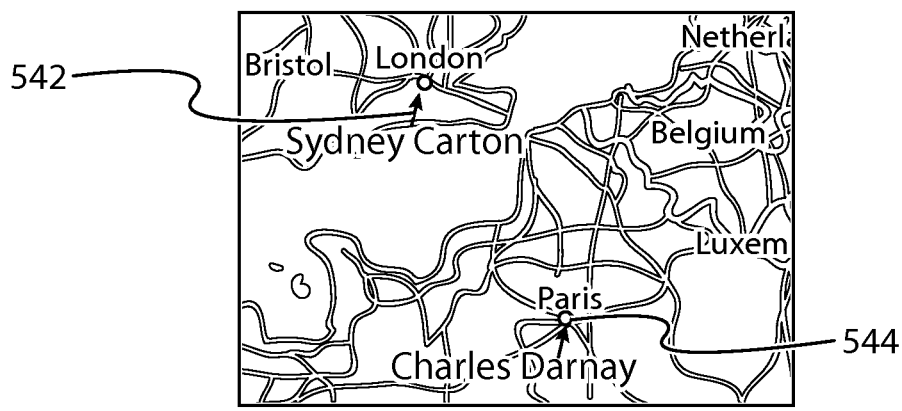

FIGS. 5A-5C are diagrams illustrating visual representations of location identity according to at least one example embodiment. The examples of FIGS. 5A-5C are merely examples and do not limit the scope of the claims. For example, representation of information may vary, format of visual representations may vary, orientation may vary, and/or the like.

In many circumstances, it may be desirable to provide a visualization scheme for a document, such as an electronic book. For example, when the user browses the pages of a document, a visualization may be created to depict an event setting, which corresponds to a current location in the content of the document. There may be various types of visualizations that may assist the user in comprehending a section of the document. For example, there may be a map based visualization that allows the user to identify character locations on the map that are pertinent to the section of the document. In another example, there may be a scene based visualization that allows the user to identify character locations by way of scene depiction involving the character.

For example, a user may want to continue reading the Lord of the Rings electronic book, which he already started months ago. He may start browsing the electronic book. The user may benefit from a visualization appearing in the browsing mode interaction illustrating the number of character identities, the location of character identities, and/or the like, appearing in the browsed sections of the electronic book. Such a visualization may make it easier for the user to find a specific section of the electronic book (e.g. where Frodo and Gandalf both travel to the shore to complete a quest), to remember a portion of the electronic book (e.g., refresh the user's memory as to the progression of Frodo's journey), and/or the like.

In circumstances where the document concerns a real world environment, a map service may be used as basis of the map visualization. In such a visualization the location identities and character identities may be represented. If the document concerns fictitious locations, map of the visualization may be based, at least in part, on map information provided by the publisher of the document.

In some circumstances, it may be desirable for the visualization to identify character locations by way of scene depiction involving the character. For example, images comprising a scene indicative of a location identity may be used to visualize the document locations absent or as a complement to a map. In this manner, the location identities may be used as at least a partial basis for web image searches to retrieve such images based, at least in part, on the location identities. In at least one example embodiment, a scene depiction may be based, at least in part, on information provided by the publisher of the document.

In at least one example embodiment, the apparatus determines at least one visual representation of a location identity such that the visual representation of the location identity comprises a visual representation of the character identity. The visual representation of the character identity may indicate a relationship between the character identity and the location identity. The visual representation of the character identity may relate to an icon, a textual representation of the character identity, and/or the like. The visual representation of the character identity may relate to an image of the character of the character identity. In at least one example embodiment, the apparatus determines the visual representation of the character identity. For example, the apparatus may perform a search for the image of the character by way of an internet search engine. The search may be based, at least in part, on the character identity. In at least one example embodiment, the apparatus may receive one or more images, based, at least in part, on the search. For example the apparatus may select one or more images received in relation to the search as the image of the character of the character identity.

In at least one example embodiment, indication of the relationship between the character identity and the location identity relates to the visual representation of the character identity corresponding to the location of the location identity in the visual representation of the location identity. For example, visual representation of the character identity may demark a location of the character identity such that the location corresponds with the location identity.

In at least one example embodiment, the location identity relates to a map location. In such an example, the visual representation of the location identity may relate to a map that comprises the location identity. Determination of the map may be similar as described regarding FIG. 9, FIG. 10, and/or the like. In at least one example embodiment, indication of the relationship between the character identity and the location identity relates to the visual representation of the character identity corresponding to the location of the location identity in the visual representation of the location identity. For example, the visual representation of the location identity may comprise a visual indication of the character identity that overlays the map at a location that corresponds with the location identity.

FIG. 5A is a diagram illustrating visual representation of location identity 500 according to at least one example embodiment. In at least one example embodiment, the example of FIG. 5A relates to the content of the examples of FIG. 4A, FIG. 4B, and/or the like. It can be seen that the visual representation of FIG. 5A relates to a map that shows the location of "Temple Bar" in London. It can be seen that visual representation of character identity 502 is located to correspond with the location of "Temple Bar" within visual representation of location identity 500. In this manner, visual representation of location identity 500 indicates that character identity "Jerry Cruncher" is at the map location of "Temple Bar."

In at least one example embodiment, the apparatus determines an image of a scene to be comprised by the visual representation of the location identity. The determination of the image of the scene may be similar as described regarding FIG. 11, and/or the like. In at least one example embodiment, indication of a relationship between the character identity and the location identity relates to the visual representation of the character identity being within the scene of the image. For example, the apparatus may overlay the visual representation of the character identity on the image of the scene.

FIG. 5B is a diagram illustrating visual representation of location identity 520 according to at least one example embodiment. In at least one example embodiment, the example of FIG. 5B relates to the content of the examples of FIG. 4A, FIG. 4B, and/or the like. It can be seen that the visual representation of FIG. 5B relates to an image of a scene that shows a scene at "Temple Bar" in London. It can be seen that visual representation of character identity 522 is located to correspond with the scene of "Temple Bar" within visual representation of location identity 520. In this manner, visual representation of location identity 520 indicates that character identity "Jerry Cruncher" is at the location of "Temple Bar."

In some circumstances, the document may describe characters in relation to a particular range of locations. For example, the document may describe a character in relation to a location and may describe a different character in relation to a different location. In another example, the document may describe a character transitioning from a location to a different location. In such circumstances, it may be desirable to format a representation of a map to include the span of location that relate to the section of the book indicated by the map. For example, it may be desirable to alter a zoom level of the map, to crop the map, and/or the like.

In at least one example embodiment, the visual representation of the location information relates to a plurality of location identities. In such an example, the apparatus may determine a map representation that comprises the plurality of location identities. For example, the apparatus may perform a zoom-out operation to cause the map to include the plurality of location identities, may perform a zoom-in operation to cause the map to preclude location identities that are not relevant to the plurality of location identities, and/or the like.

In at least one example embodiment, the apparatus determines a character identity related to a location identity and another character identity related to another location identity. In such an example, visual representation of the location identity may comprise a visual representation of the other location identity such that the visual representation of the other location identity comprises a visual representation of the other character identity that indicates a relationship between the other character identity and the other location identity. For example, the location identity and the other location identity may relate to map locations and the visual representation of the location identity may relate to a map that comprises the location identity and the other location identity. In such an example, indication of the relationship between the other character identity and the other location identity may relate to the visual representation of the other character identity corresponding to the location of the other location identity in the visual representation of the other location identity. In such an example, determination of the visual representation of the location identity may comprise determination of a zoom level of the map of the map, a crop region of the map, and/or the like. Such determination may be performed such that the resulting map comprises the location identity and the other location identity.

FIG. 5C is a diagram illustrating visual representations of location identity 540 according to at least one example embodiment. It can be seen that the visual representation of FIG. 5C relates to a map that shows a map that includes location identity "London" and location identity "Paris." It can be seen that visual representation of character identity 542 is located to correspond with location of "London" within the map. In this manner, visual representation of location identity 540 indicates that character identity "Sydney Carton" is at the location of "London." It can be seen that visual representation of character identity 544 is located to correspond with location of "Paris" within the map. In this manner, visual representation of location identity 540 indicates that character identity "Charles Darnay" is at the location of "Paris." In the example of FIG. 5C, the apparatus may have altered zoom level of the map to determine visual representation of location identity 540. In the example of FIG. 5C, the apparatus may have cropped the map to determine visual representation of location identity 540.

Figure 6:
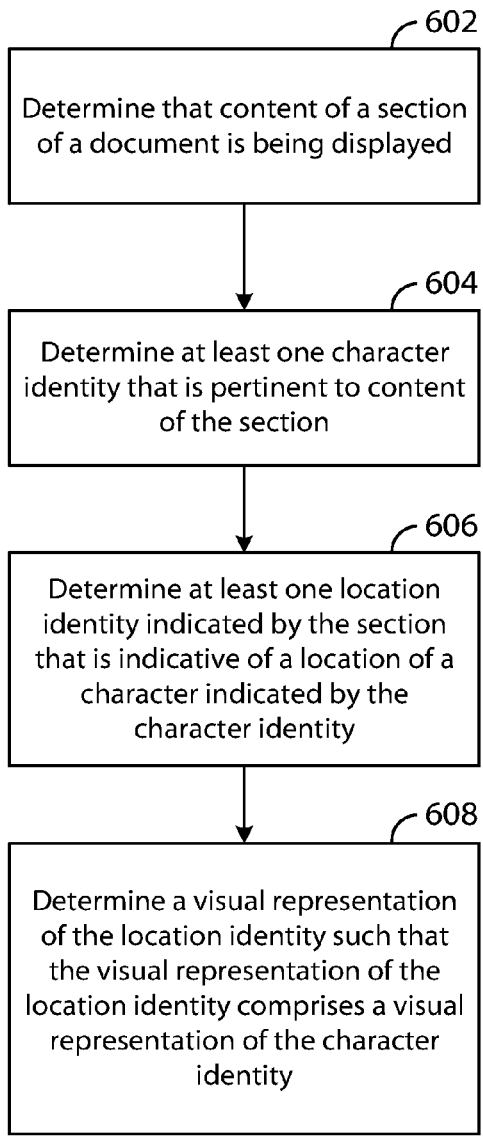
FIG. 6 is a flow diagram illustrating activities associated with determination of a visual representation of a location identity and a character identity according to at least one example embodiment.

FIG. 6 is a flow diagram illustrating activities associated with determination of a visual representation of a location identity and a character identity according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus determines that, at least a part of, content of a section of a document is being displayed. The determination, the content, the section, and the document may be similar as described regarding FIGS. 3A-3B, and/or the like.

At block 604, the apparatus determines at least one character identity. The determination and the character identity may be similar as described regarding FIGS. 4A-4B, and/or the like. In at least one example embodiment, the character identity is pertinent to content of the section. For example, the apparatus may base determination of the character identity at least in part on a determination that the character identity is comprised by the section of the document.

At block 606, the apparatus determines at least one location identity indicated by the section. The determination and the location identity may be similar as described regarding FIGS. 4A-4B, and/or the like. In at least one example embodiment, the location identity is indicative of a location of a character indicated by the character identity. In at least one example embodiment, the apparatus determines at least one location identity indicated by the content of the section.

At block 608, the apparatus determines at least one visual representation of the location identity such that the visual representation of the location identity comprises a visual representation of the character identity that indicates a relationship between the character identity and the location identity. The determination, the visual representation of the location identity, the visual representation of the character identity, and the relationship may be similar as described regarding FIGS. 5A-5C, and/or the like.

Figure 7:
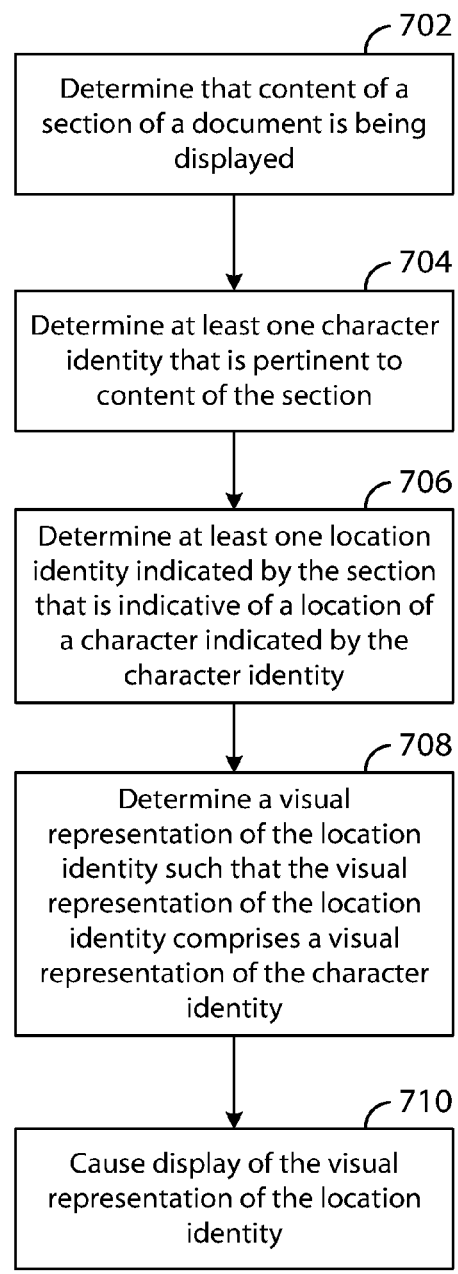
FIG. 7 is a flow diagram illustrating activities associated with determination of a visual representation of a location identity and a character identity according to at least one example embodiment.

FIG. 7 is a flow diagram illustrating activities associated with determination of a visual representation of a location identity and a character identity according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

In some circumstances, the apparatus may cause display of the visual representation of the location identity. The apparatus may cause display of the visual representation of the location identity during a browsing mode, during a reading mode, and/or the like. For example, the apparatus may limit causation of display to browsing mode, may allow for causation of display in a non-browsing mode, and/or the like.

At block 702, the apparatus determines that, at least a part of, content of a section of a document is being displayed, similarly as described regarding block 602 of FIG. 6. At block 704, the apparatus determines at least one character identity, similarly as described regarding block 604 of FIG. 6. At block 706, the apparatus determines at least one location identity indicated by the section, similarly as described regarding block 606 of FIG. 6. At block 708, the apparatus determines at least one visual representation of the location identity such that the visual representation of the location identity comprises a visual representation of the character identity that indicates a relationship between the character identity and the location identity, similarly as described regarding block 608 of FIG. 6.

At block 710, the apparatus causes display of the visual representation of the location identity. Causation of display of the visual representation of the location identity may comprise displaying the visual representation of the location identity, sending information to an external apparatus that causes the external apparatus to display of the visual representation of the location identity, and/or the like. In at least one example embodiment, the display of the visual representation of the location identity is caused to be proximate to the part of the section being displayed. For example, the apparatus may cause display of the visual representation of the location identity proximate to content 302 of FIG. 3A, proximate to book representation 322 of FIG. 3B, and/or the like. In at least one example embodiment, the display of the visual representation of the location identity is caused to be above the part of the section. For example, the apparatus may cause display of the visual representation of the location identity above content 302 of FIG. 3A, above book representation 322 of FIG. 3B, and/or the like.

FIG. 8 is a flow diagram illustrating activities associated with determination of a visual representation of a location identity and a character identity according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

In some circumstances, it may be desirable for a particular input to initiate display of the visual representation of the location identity, to invoke determination of the visual representation of the location identity, and/or the like. For example, it may be desirable a user to be able to perform a drag touch input that causes display of the visual representation of the location identity while the user continues to retain contact with the display. In such an example, the user may perform an input that designates utilization of a browsing mode.

In at least one example embodiment, the apparatus receives information indicative of a document browsing input. In such an example, the causation of display of the visual representation of the location identity may be based, at least in part, on the document browsing input. For example, the causation of display of the visual representation of the location identity may be caused by the document browsing input. The document browsing input may be any input associated with the browsing mode. For example, the document browsing input may relate to an input that invokes browsing mode, that changes which part of the content of the section of the document is displayed, that changes the section of the document that is being displayed, and/or the like. In at least one example embodiment, the document browsing input is distinct from a reading navigation input. The reading navigation input may relate to an input associated with navigation of the document during reading. For example, the reading navigation input may relate to an input that invokes reading mode, that changes which part of the content of the section of the document is displayed, that changes the section of the document that is being displayed, and/or the like.

In at least one example embodiment, the document browsing input relates to a continuous stroke input. The continuous stroke input may be similar as described regarding FIGS. 2A-2E, and/or the like. In such an example, causation of display of the visual representation of the location identity corresponds with contact of the continuous stroke input. For example, receipt of the contact input may cause the apparatus to cause display of the visual representation of the location identity. In at least one example embodiment, the continuous stroke input comprises a contact input and a release input. In such an example, the causation of display of the visual representation of the location information corresponds with the contact input. For example, the apparatus may cause termination of display of the visual representation of the location identity, such that the termination of display corresponds with the release input.

At block 802, the apparatus receives information indicative of a document browsing input. At block 804, the apparatus determines that, at least a part of, content of a section of a document is being displayed, similarly as described regarding block 602 of FIG. 6. At block 806, the apparatus determines at least one character identity, similarly as described regarding block 604 of FIG. 6. At block 808, the apparatus determines at least one location identity indicated by the section, similarly as described regarding block 606 of FIG. 6. At block 810, the apparatus determines at least one visual representation of the location identity such that the visual representation of the location identity comprises a visual representation of the character identity that indicates a relationship between the character identity and the location identity, similarly as described regarding block 608 of FIG. 6. At block 812, the apparatus causes display of the visual representation of the location identity similarly as described regarding block 710 of FIG. 7.

FIG. 9 is a flow diagram illustrating activities associated with determination of a visual representation of a location identity and a character identity according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

In some circumstances, it may be desirable for the apparatus to retrieve a map to utilize for the visual representation of the location identity. For example, the apparatus may lack a map that corresponds with the location identity, and may benefit from being able to acquire a map from separate source.

In at least one example embodiment, the apparatus retrieves a map based, at least in part, on the location identity and the other location identity. For example, the location identity may relate to a non-fictional location. In such an example, the retrieval of the map comprises retrieval of the map from a map service. A map service may relate to a service that provides map information. For example, the map service may relate to a map server that provides map information in response to a search query that identifies location information that corresponds to map information of the server. In such an example, the server may respond to the search query by providing at least one map that comprises map information indicted by the search query. In this manner, the apparatus may retrieve the map based, at least in part, on the location identity. In such an example, the apparatus may perform retrieval of the map from the map service by way of sending a search query to the map service that identifies the location identity.

At block 902, the apparatus determines that, at least a part of, content of a section of a document is being displayed, similarly as described regarding block 602 of FIG. 6. At block 904, the apparatus determines at least one character identity, similarly as described regarding block 604 of FIG. 6. At block 906, the apparatus determines at least one location identity indicated by the section, similarly as described regarding block 606 of FIG. 6.

At block 908, the apparatus retrieves a map, from a map service, based, at least in part on the location identity. At block 910, the apparatus determines at least one visual representation of the location identity such that the visual representation of the location identity comprises a visual representation of the character identity that indicates a relationship between the character identity and the location identity in relation to at least part of the map. The determination, the visual representation of the location identity, the visual representation of the character identity, and the relationship may be similar as described regarding FIGS. 5A-5C, and/or the like.

Figure 10:
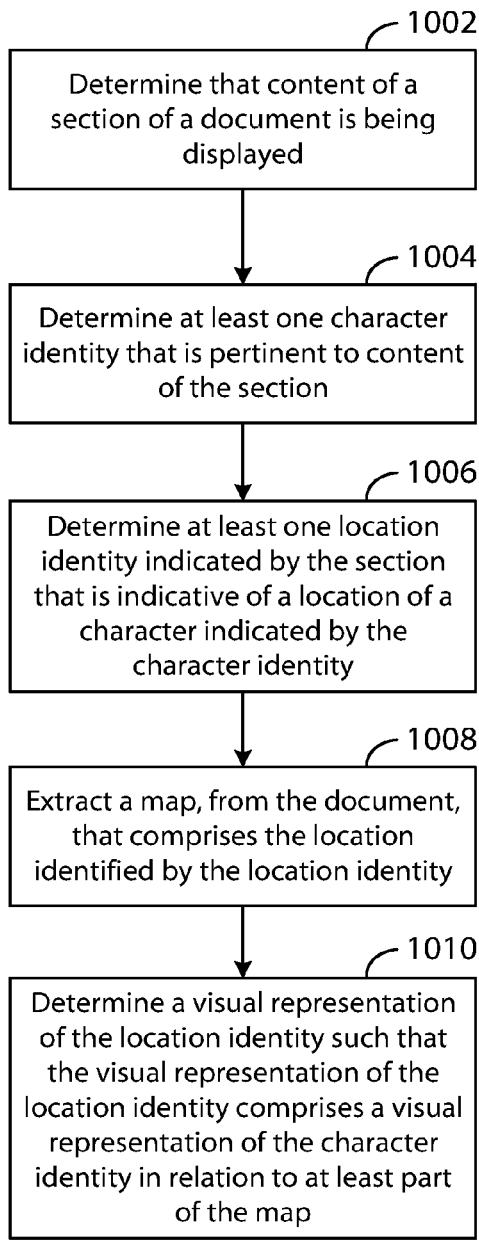
FIG. 10 is a flow diagram illustrating activities associated with determination of a visual representation of a location identity and a character identity according to at least one example embodiment.

FIG. 10 is a flow diagram illustrating activities associated with determination of a visual representation of a location identity and a character identity according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

In some circumstances, it may be desirable for the apparatus to retrieve a map to utilize for the visual representation of the location identity. For example, the apparatus may lack a map that corresponds with the location identity, and may benefit from being able to acquire a map by way of the document. In some circumstances, the document may comprise information indicative of the map. For example, the document may comprise metadata that includes the map, may comprise an image that includes the map, may comprise metadata that identifies a source from which the map may be received, and/or the like.

In at least one example embodiment, the apparatus retrieves a map by way of extraction of information indicative of the map from the document. For example, the location identity may relate to a fictional location, and retrieval of the map may comprise extraction of the map from the document. In at least one example embodiment, the document comprises metadata that comprises information indicative of the map, and extraction of the map from the document comprises copying of the metadata from the document. In some circumstances, the metadata may comprise information that allows the apparatus to receive the map. For example the metadata may comprise a uniform resource locator that identifies a location from which the map may be received.

At block 1002, the apparatus determines that, at least a part of, content of a section of a document is being displayed, similarly as described regarding block 602 of FIG. 6. At block 1004, the apparatus determines at least one character identity, similarly as described regarding block 604 of FIG. 6. At block 1006, the apparatus determines at least one location identity indicated by the section, similarly as described regarding block 606 of FIG. 6.

At block 1008, the apparatus extracts a map, from the document, based, at least in part on the location identity. For example, extraction of the map from the document may comprise copying of the metadata from the document. For example, the apparatus may copy a uniform resource locator from the document, may copy information indicative of the map from the document, and/or the like. At block 1010, the apparatus determines at least one visual representation of the location identity such that the visual representation of the location identity comprises a visual representation of the character identity that indicates a relationship between the character identity and the location identity in relation to at least part of the map. The determination, the visual representation of the location identity, the visual representation of the character identity, and the relationship may be similar as described regarding FIGS. 5A-5C, and/or the like.

Figure 11:
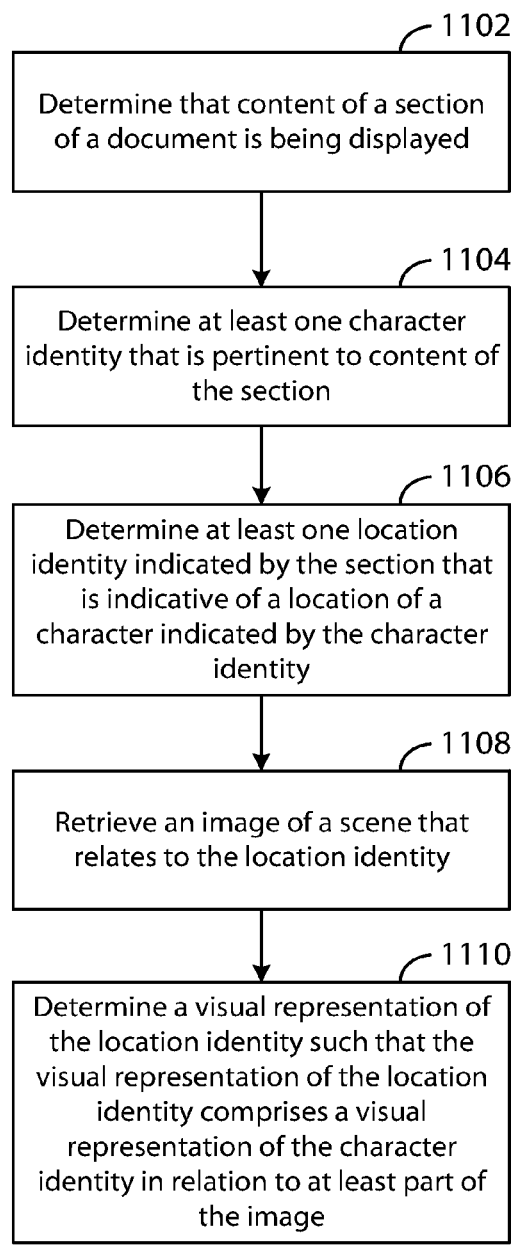
FIG. 11 is a flow diagram illustrating activities associated with determination of a visual representation of a location identity and a character identity according to at least one example embodiment.

FIG. 11 is a flow diagram illustrating activities associated with determination of a visual representation of a location identity and a character identity according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

In some circumstances, it may be desirable for the apparatus to retrieve an image of a scene to utilize for the visual representation of the location identity. For example, the apparatus may lack an image of a scene that corresponds with the location identity, and may benefit from being able to acquire such an image from separate source.

In at least one example embodiment, the apparatus retrieves an image based, at least in part, on the location identity. For example, the location identity may relate to a non-fictional location. In such an example, the retrieval of the image of the scene comprises retrieval of the image from a website that comprises the image. The apparatus may perform a search query that identifies the location identity, and select an image based, at least in part, on the result of the search query. In this manner, the apparatus may retrieve the image based, at least in part on the location identity. In such an example, the apparatus may perform retrieval of the image from the website service by way of sending a search query to a search engine that identifies the location identity.

At block 1102, the apparatus determines that, at least a part of, content of a section of a document is being displayed, similarly as described regarding block 602 of FIG. 6. At block 1104, the apparatus determines at least one character identity, similarly as described regarding block 604 of FIG. 6. At block 1106, the apparatus determines at least one location identity indicated by the section, similarly as described regarding block 606 of FIG. 6.

At block 1108, the apparatus retrieves an image of a scene, from a map service, based, at least in part on the location identity. At block 1110, the apparatus determines at least one visual representation of the location identity such that the visual representation of the location identity comprises a visual representation of the character identity that indicates a relationship between the character identity and the location identity in relation to at least part of the image. The determination, the visual representation of the location identity, the visual representation of the character identity, and the relationship may be similar as described regarding FIGS. 5A-5C, and/or the like.

Figure 12:
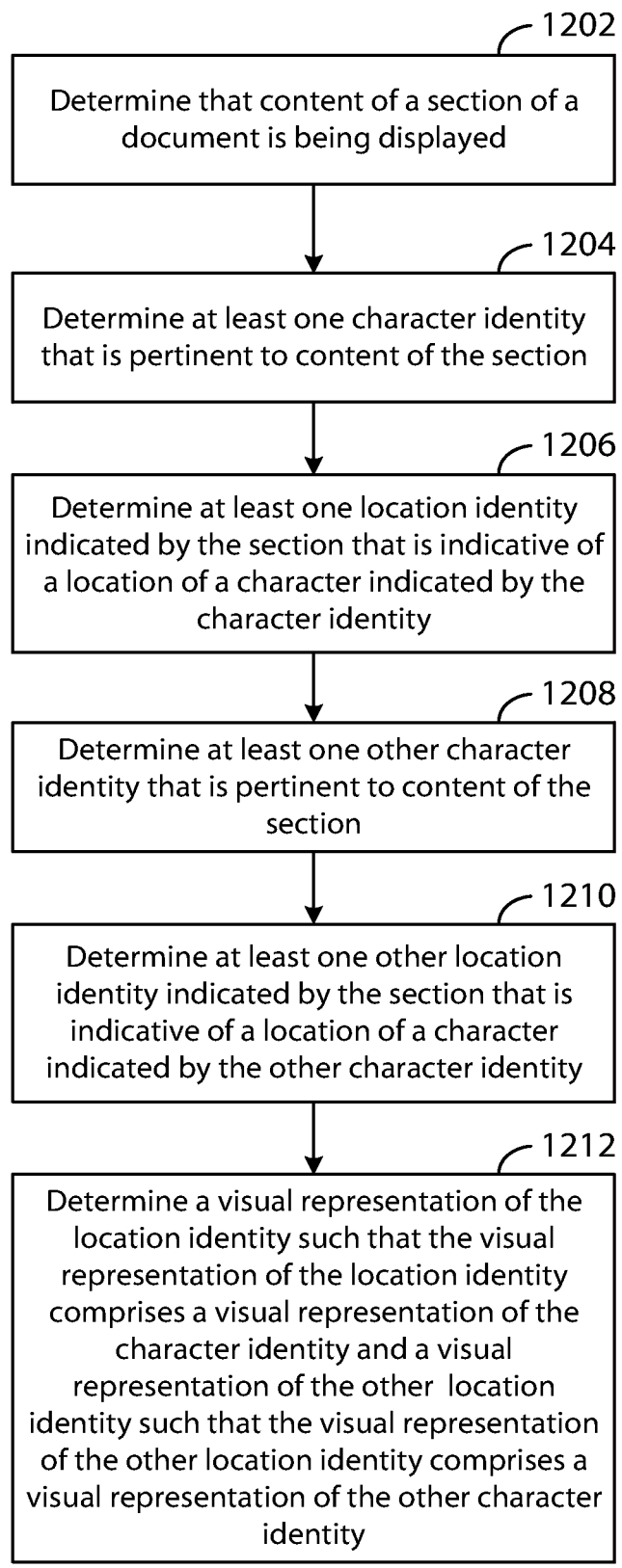
FIG. 12 is a flow diagram illustrating activities associated with determination of a visual representation of a location identity and a character identity according to at least one example embodiment.

FIG. 12 is a flow diagram illustrating activities associated with determination of a visual representation of a location identity and a character identity according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

In some circumstances, it may be desirable for the visual representation of the location identity to comprise visual representations of a plurality of character identities, similarly as described regarding FIG. 5C, and/or the like.

At block 1202, the apparatus determines that, at least a part of, content of a section of a document is being displayed, similarly as described regarding block 602 of FIG. 6. At block 1204, the apparatus determines at least one character identity, similarly as described regarding block 604 of FIG. 6. At block 1206, the apparatus determines at least one location identity indicated by the section, similarly as described regarding block 606 of FIG. 6.

At block 1208, the apparatus determines at least one other character identity. The determination and the other character identity may be similar as described regarding FIGS. 4A-4B, and/or the like. In at least one example embodiment, the other character identity is pertinent to content of the section. For example, the apparatus may base determination of the other character identity at least in part on a determination that the other character identity is comprised by the section of the document.

At block 1210, the apparatus determines at least one other location identity indicated by the section. The determination and the other location identity may be similar as described regarding FIGS. 4A-4B, and/or the like. In at least one example embodiment, the other location identity is indicative of a location of a character indicated by the other character identity. In at least one example embodiment, the apparatus determines at least one other location identity indicated by the content of the section.

At block 1212, the apparatus determines at least one visual representation of the location identity such that the visual representation of the location identity comprises a visual representation of the character identity that indicates a relationship between the character identity and the location identity and a visual representation of the other location identity such that the visual representation of the other location identity comprises a visual representation of the other character identity that indicates a relationship between the other character identity and the other location identity. The determination, the visual representation of the location identity, the visual representation of the character identity, the visual representation of the other location identity, the visual representation of the other character identity, and the relationship may be similar as described regarding FIGS. 5A-5C, and/or the like.

Figure 13:
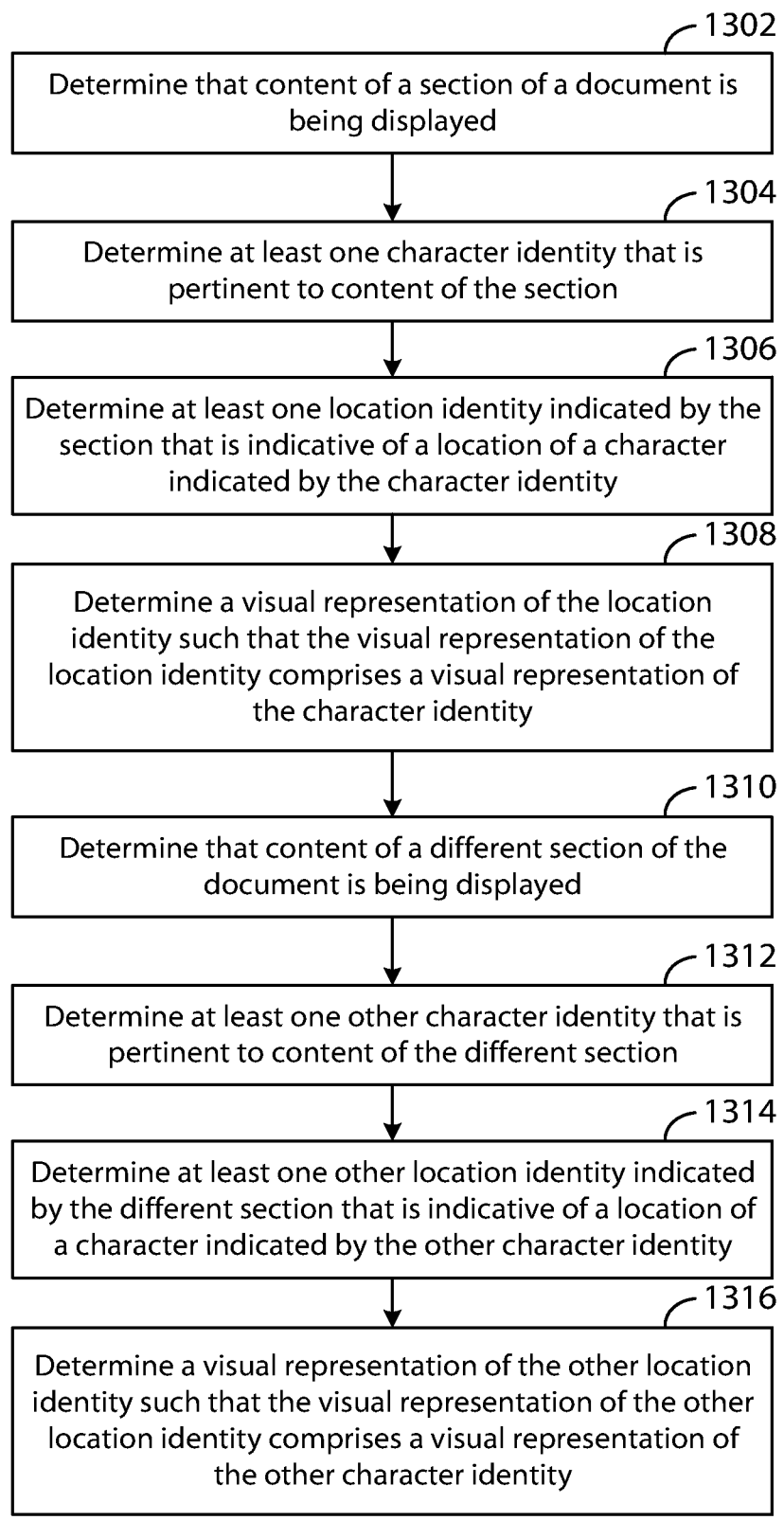
FIG. 13 is a flow diagram illustrating activities associated with determination of a visual representation of a location identity and a character identity according to at least one example embodiment.

FIG. 13 is a flow diagram illustrating activities associated with determination of a visual representation of a location identity and a character identity according to at least one example embodiment. In at least one example embodiment, there is a set of operations that corresponds with the activities of FIG. 13. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 13.

In some circumstances, it may be desirable to change the visual representation of the location identity as the user changes which content of the document is being displayed. For example, as the user browses through the document, it may be desirable for the visual representation of the location identity to become updated to indicate changes of the location identity, changes of the character identity, and/or the like. For example, the user may desire to obtain an understanding of the content of a document as the user traverses the sections of a book in a browsing mode. In such an example, the user may be able to perceive occurrences of the content of the document based, at least in part, on changes of the visual representation of the location identity. For example, the user may be able to perceive addition of character identities, removal character identities, movement of character identities, and/or the like. Correspondingly, when the user is browsing a video file comprising a movie, for example, using a user interface which depicts a sequence of keyframes, it may be advantageous if another portion of the display depicts a visual representation of the location identity.

At block 1302, the apparatus determines that, at least a part of, content of a section of a document is being displayed, similarly as described regarding block 602 of FIG. 6. At block 1304, the apparatus determines at least one character identity, similarly as described regarding block 604 of FIG. 6. At block 1306, the apparatus determines at least one location identity indicated by the section, similarly as described regarding block 606 of FIG. 6. At block 1308, the apparatus determines at least one visual representation of the location identity such that the visual representation of the location identity comprises a visual representation of the character identity that indicates a relationship between the character identity and the location identity, similarly as described regarding block 608 of FIG. 6.

At block 1310, the apparatus the apparatus determines that, at least a part of, different content of a section of a document is being displayed. The determination, the content, and the different section, may be similar as described regarding FIGS. 3A-3B, and/or the like.

At block 1312, the apparatus determines at least one other character identity. The determination and the other character identity may be similar as described regarding FIGS. 4A-4B, and/or the like. In at least one example embodiment, the other character identity is pertinent to content of the different section. For example, the apparatus may base determination of the other character identity at least in part on a determination that the other character identity is comprised by the different section of the document.

At block 1314, the apparatus determines at least one other location identity indicated by the different section. The determination and the other location identity may be similar as described regarding FIGS. 4A-4B, and/or the like. In at least one example embodiment, the other location identity is indicative of a location of a character indicated by the other character identity. In at least one example embodiment, the apparatus determines at least one other location identity indicated by the different content of the section.

At block 1316, the apparatus determines at least one visual representation of the other location identity such that the visual representation of the other location identity comprises a visual representation of the other character identity that indicates a relationship between the other character identity and the other location identity. The determination, the visual representation of the other location identity, the visual representation of the other character identity, and the relationship may be similar as described regarding FIGS. 5A-5C, and/or the like.

Figure 14:
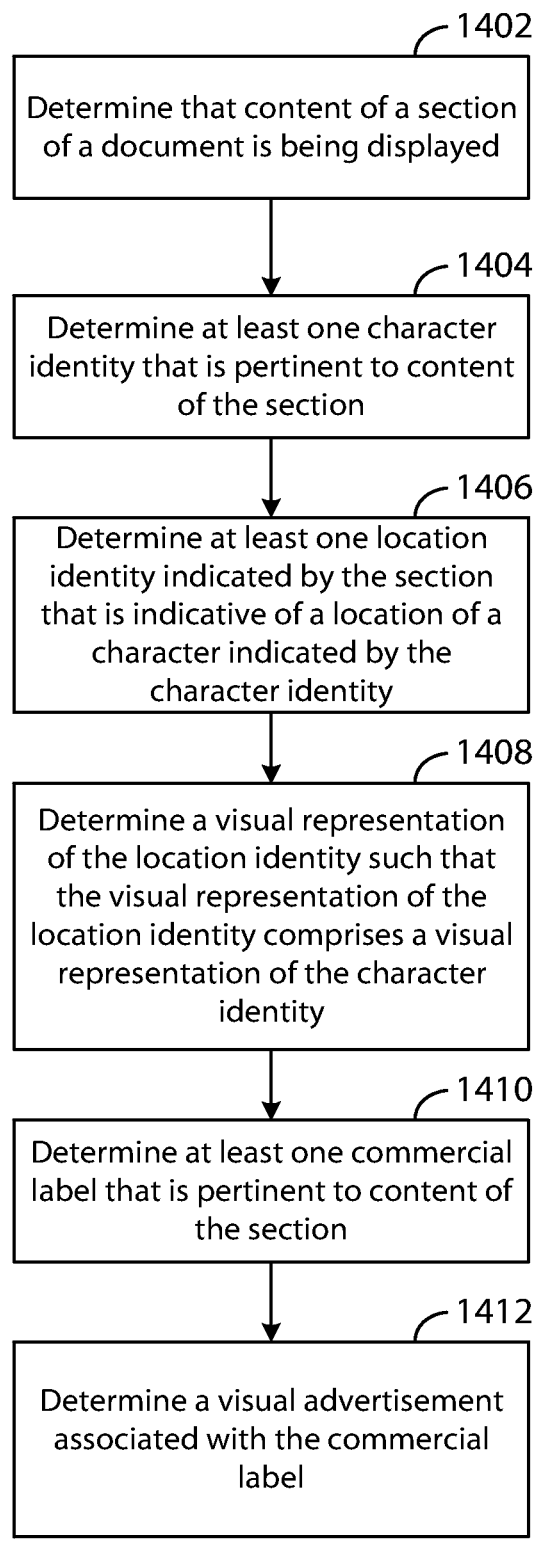
FIG. 14 is a flow diagram illustrating activities associated with determination of a visual representation of a location identity and a character identity according to at least one example embodiment.

FIG. 14 is a flow diagram illustrating activities associated with determination of a visual representation of a location identity and a character identity according to at least one example embodiment. In at least one example embodiment, there is a set of operations that corresponds with the activities of FIG. 14. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 14.

In some circumstances, the document may comprise information indicative of a commercial label, such as a logo, a company name, a product name, and/or the like. In such an example, it may be desirable to provide advertising associated with the commercial label. For example, the advertising may be included in the visual representation of the location identity, may be provided separately from any visual representation of the location identity, and/or the like. In such an example, the publisher, the document reader, the apparatus vendor, and/or the like, may be able to receive income associated with performance of the advertising. In this manner, such advertising may allow achievement of revenue streams for one or more parties associated with the apparatus.

In at least one example embodiment, the apparatus determines at least one commercial label, such that the commercial label is pertinent to content of a section of the document being displayed. For example, the commercial label may relate to a product name, a company name, a trademark, a slogan, and/or the like. In at least one example embodiment, determination of the commercial label comprises identification of metadata that corresponds with the commercial label. For example, the document may comprise metadata that includes information indicative of the commercial label. In at least one example embodiment, determination of the commercial label comprises identification of non-metadata content of the section that identifies the commercial label. In such an example, the non-metadata content relates to non-metadata textual information that identifies the commercial label.

In at least one example embodiment, the apparatus determines a visual advertisement associated with the commercial label. The apparatus may extract the visual advertisement from the document, may search for the visual advertisement based on the commercial label, and/or the like. In at least one example embodiment, the apparatus causes display of the visual advertisement in relation to the visual representation of the location identity, similarly as previously described.

At block 1402, the apparatus determines that, at least a part of, content of a section of a document is being displayed, similarly as described regarding block 602 of FIG. 6. At block 1404, the apparatus determines at least one character identity, similarly as described regarding block 604 of FIG. 6. At block 1406, the apparatus determines at least one location identity indicated by the section, similarly as described regarding block 606 of FIG. 6. At block 1408, the apparatus determines at least one visual representation of the location identity such that the visual representation of the location identity comprises a visual representation of the character identity that indicates a relationship between the character identity and the location identity, similarly as described regarding block 608 of FIG. 6.

At block 1410, the apparatus determines at least one commercial label. In at least one example embodiment, the commercial label is pertinent to content of the section. For example, the apparatus may base determination of the commercial label at least in part on a determination that the commercial label is comprised by the section of the document.

At block 1412, the apparatus determines a visual advertisement associated with the commercial label. The apparatus may further cause display of the visual advertisement.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 1404 of FIG. 14 may be performed after block 1410. Furthermore, if desired, one or more of the above-described functions may be optional or may be combined. For example, block 1412 of FIG. 14 may be optional and/or combined with block 1410 of FIG. 14.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor;

at least one memory including computer program code, the memory and the computer program code configured to, working with the processor, cause the apparatus to perform at least the following:

determine that, at least a part of, content of a section of a document is being displayed;

determine at least one character identity, the character identity being pertinent to content of the section;

determine at least one location identity indicated by the section, the location identity being indicative of a location of a character indicated by the character identity; and determine at least one visual representation of the location identity such that the visual representation of the location identity comprises a visual representation of the character identity that indicates a relationship between the character identity and the location identity.

2. The apparatus of claim 1, wherein the memory includes computer program code configured to, working with the processor, cause the apparatus to perform:

causation of display of the visual representation of the location identity; and receipt of information indicative of a document browsing input, wherein the causation of display of the visual representation of the location identity is based, at least in part, on the document browsing input.

3. The apparatus of claim 1, wherein the memory includes computer program code configured to, working with the processor, cause the apparatus to perform:

determination of at least one other character identity, the other character identity being pertinent to content of the section and being different than the character identity; and determination of at least one other location identity indicated by the section, the location identity being indicative of a location of a character indicated by the character identity, wherein the visual representation of the location identity comprises a visual representation of the other location identity such that the visual representation of the other location identity comprises a visual representation of the other character identity that indicates a relationship between the other character identity and the other location identity.

4. The apparatus of claim 1, wherein the memory includes computer program code configured to, working with the processor, cause the apparatus to perform:

determination that, at least part of, a different section of the document is being displayed;

determination of at least one other character identity, the other character identity being pertinent to content of the different section;

determination of at least one other location identity indicated by the different section, the other location identity being indicative of a location of a character indicated by the other character identity; and determination of at least one visual representation of the other location identity such that the visual representation of the other location identity comprises a visual representation of the other character identity that indicates a relationship between the other character identity and the other location identity.

5. The apparatus of claim 1, wherein the memory includes computer program code configured to, working with the processor, cause the apparatus to perform retrieval of a map based, at least in part on the location identity, wherein the location identity relates to a location of the map and the visual representation of the location identity relates to the map.

6. The apparatus of claim 1, wherein the memory includes computer program code configured to, working with the processor, cause the apparatus to perform retrieval of a map based, at least in part on the location identity, wherein the location identity relates to a fictional location, and retrieval of the map comprises extraction of the map from the document.

7. The apparatus of claim 1, wherein the memory includes computer program code configured to, working with the processor, cause the apparatus to perform retrieval of an image of a scene based, at least in part on the location identity, wherein the visual representation of the location identity relates to the image.

8. The apparatus of claim 1, wherein the memory includes computer program code configured to, working with the processor, cause the apparatus to perform:

determination of at least one commercial label, the commercial label being pertinent to content of the section; and determination of a visual advertisement associated with the commercial label.

9. The apparatus of claim 1, wherein the apparatus comprises a display.

10. A method comprising:

determining that, at least a part of, content of a section of a document is being displayed;

determining at least one character identity, the character identity being pertinent to content of the section;

determining at least one location identity indicated by the section, the location identity being indicative of a location of a character indicated by the character identity; and determining at least one visual representation of the location identity such that the visual representation of the location identity comprises a visual representation of the character identity that indicates a relationship between the character identity and the location identity.

11. The method of claim 10, further comprising:

causation of display of the visual representation of the location identity; and receipt of information indicative of a document browsing input, wherein the causation of display of the visual representation of the location identity is based, at least in part, on the document browsing input.

12. The method of claim 10, further comprising:

determination of at least one other character identity, the other character identity being pertinent to content of the section and being different than the character identity; and determination of at least one other location identity indicated by the section, the location identity being indicative of a location of a character indicated by the character identity, wherein the visual representation of the location identity comprises a visual representation of the other location identity such that the visual representation of the other location identity comprises a visual representation of the other character identity that indicates a relationship between the other character identity and the other location identity.

13. The method of claim 10, further comprising:

determination that, at least part of, a different section of the document is being displayed;

determination of at least one other character identity, the other character identity being pertinent to content of the different section;

determination of at least one other location identity indicated by the different section, the other location identity being indicative of a location of a character indicated by the other character identity; and determination of at least one visual representation of the other location identity such that the visual representation of the other location identity comprises a visual representation of the other character identity that indicates a relationship between the other character identity and the other location identity.

14. The method of claim 10, further comprising retrieval of a map based, at least in part on the location identity, wherein the location identity relates to a location of the map and the visual representation of the location identity relates to the map.

15. The method of claim 10, further comprising retrieval of a map based, at least in part on the location identity, wherein the location identity relates to a fictional location, and retrieval of the map comprises extraction of the map from the document.

16. The method of claim 10, further comprising retrieval of an image of a scene based, at least in part on the location identity, wherein the visual representation of the location identity relates to the image.

17. At least one non-transitory computer-readable medium encoded with instructions that, when executed by a processor, perform:

determine that, at least a part of, content of a section of a document is being displayed;

determine at least one character identity, the character identity being pertinent to content of the section;

determine at least one location identity indicated by the section, the location identity being indicative of a location of a character indicated by the character identity; and determine at least one visual representation of the location identity such that the visual representation of the location identity comprises a visual representation of the character identity that indicates a relationship between the character identity and the location identity.

18. The medium of claim 17, further encoded with instructions that, when executed by a processor, perform:

causation of display of the visual representation of the location identity; and receipt of information indicative of a document browsing input, wherein the causation of display of the visual representation of the location identity is based, at least in part, on the document browsing input.

19. The medium of claim 17, further encoded with instructions that, when executed by a processor, perform:

determination of at least one other character identity, the other character identity being pertinent to content of the section and being different than the character identity; and determination of at least one other location identity indicated by the section, the location identity being indicative of a location of a character indicated by the character identity, wherein the visual representation of the location identity comprises a visual representation of the other location identity such that the visual representation of the other location identity comprises a visual representation of the other character identity that indicates a relationship between the other character identity and the other location identity.

20. The medium of claim 17, further encoded with instructions that, when executed by a processor, perform:

determination that, at least part of, a different section of the document is being displayed;

determination of at least one other character identity, the other character identity being pertinent to content of the different section;

determination of at least one other location identity indicated by the different section, the other location identity being indicative of a location of a character indicated by the other character identity; and determination of at least one visual representation of the other location identity such that the visual representation of the other location identity comprises a visual representation of the other character identity that indicates a relationship between the other character identity and the other location identity.

\* \* \* \* \*